US006007291A

United States Patent [19]
Ghibaudo

[11] Patent Number: 6,007,291
[45] Date of Patent: Dec. 28, 1999

[54] PACKER SYSTEM FOR REFUSE COLLECTION VEHICLE

[75] Inventor: Jose A. Ghibaudo, Alta Loma, Calif.

[73] Assignee: Amrep, Inc., Ontario, Calif.

[21] Appl. No.: 08/953,891

[22] Filed: Oct. 20, 1997

[51] Int. Cl.[6] .......... B60P 1/00
[52] U.S. Cl. .......... 414/512; 100/218; 414/517; 414/525.6; 414/409
[58] Field of Search .......... 414/408, 409, 414/406, 509, 511, 512, 513, 517, 518, 525.2, 525.3, 525.4, 525.55, 525.6; 100/218

[56] References Cited

U.S. PATENT DOCUMENTS

| | | | |
|---|---|---|---|
| 3,749,261 | 7/1973 | Herpich et al. | 414/517 |
| 3,815,765 | 6/1974 | Moser et al. | 414/512 |
| 3,865,260 | 2/1975 | Wieschel et al. | 414/512 X |
| 3,955,694 | 5/1976 | Herpich . | |
| 3,968,891 | 7/1976 | Perkins . | |
| 4,013,181 | 3/1977 | Johnson . | |
| 4,070,962 | 1/1978 | Peterson | 100/209 |
| 4,088,071 | 5/1978 | Cruse et al. | 100/245 |
| 4,096,956 | 6/1978 | Gaskin | 414/525.55 X |
| 4,221,527 | 9/1980 | Morrison | 414/517 |
| 4,242,953 | 1/1981 | St. -Gelais | 100/100 |
| 4,273,497 | 6/1981 | Mealing et al. | 414/517 |
| 4,309,141 | 1/1982 | Van Drie | 414/509 |
| 4,310,279 | 1/1982 | Johnston | 414/408 |
| 4,316,695 | 2/1982 | Knight, Sr. | 414/517 |
| 4,358,238 | 11/1982 | Ely | 414/387 |
| 4,530,620 | 7/1985 | McCartney | 404/121 |
| 4,552,500 | 11/1985 | Ghibaudo et al. | 414/408 |
| 4,599,031 | 7/1986 | Pickler | 414/507 |
| 4,691,959 | 9/1987 | Verner | 296/184 |
| 4,694,846 | 9/1987 | Bouchard | 134/78 |
| 4,729,304 | 3/1988 | Gardella et al. | 100/218 |
| 4,877,366 | 10/1989 | De Filippi | 414/517 |
| 4,913,301 | 4/1990 | Pickler | 220/1 T |
| 4,934,896 | 6/1990 | De Filippi | 414/498 |
| 4,948,323 | 8/1990 | Gasparini | 414/512 X |

FOREIGN PATENT DOCUMENTS

| | | | |
|---|---|---|---|
| 2137955 | 10/1984 | United Kingdom | 414/517 |

*Primary Examiner*—Frank E. Werner
*Attorney, Agent, or Firm*—Michael H. Jester

[57] ABSTRACT

A hollow refuse storage body having a longitudinal axis is configured for mounting on a truck chassis. The body has a forward hopper section and a rear section with an open rear end. A tailgate is mounted to the rear section of the refuse storage body and is moveable between closed and open positions to seal and unseal the open rear end of the rear section of the refuse storage body. A hollow box-like load eject blade is mounted within the refuse storage body for reciprocating movement along the longitudinal axis along a bottom floor of the refuse storage body. A hollow box-like packer blade is mounted within the refuse storage body for reciprocating movement along the longitudinal axis overlapping an upper surface of the eject blade. A pair of single stage hydraulic cylinders are coupled in criss-cross fashion between the refuse storage body and the packer blade for moving the packer blade over a first range of travel. The packer blade is moved rearwardly and forwardly in the hopper section and underneath a divider wall of the refuse storage body which prevents spring back of refuse. This permits the packer blade to repetitively push refuse periodically dumped into the hopper section of the refuse storage body and compact the refuse into the rear section of the refuse storage body. A multi-stage hydraulic cylinder is coupled between the refuse storage body and the eject blade for moving the eject blade over a second much greater range of travel. This permits the eject blade to push trash that has been compacted in the rear section of the refuse storage body by the packer blade out the open rear end of the rear section of the refuse storage body when the tailgate has been moved to its open position.

18 Claims, 7 Drawing Sheets

PACKER SYSTEM FOR REFUSE COLLECTION VEHICLE

BACKGROUND OF THE INVENTION

The present invention relates to refuse handling methods and apparatus, and more particularly, to refuse collection vehicles and methods for compacting refuse inside the same.

Refuse collection vehicles are widely used throughout the United States for picking up refuse from residences and businesses and dumping the refuse at landfills. Typically they comprise a truck chassis with a large hollow steel refuse storage body into which refuse is densely compacted. Two popular configurations for refuse collection vehicles are the front loader and the side loader. The front loader lifts a large steel refuse bin over the driver's cab with pivoting forks that invert the bin and pour its contents into a forward hopper section of the refuse storage body. The side loader has a pivoting lift arm that is extensible from the side of the vehicle to grip a plastic garbage can from a curbside, lift it upwardly along the arm, and invert the can to pour its contents into the hopper section.

Refuse collection vehicles of the foregoing type have a compactor mechanism for pushing refuse received into the hopper section rearwardly. Usually this mechanism takes the form of a single so-called packer blade which is reciprocated rearwardly and forwardly by a hydraulic cylinder to push refuse emptied into the hopper section into a rear section of the refuse storage body. Once the body has been filled with compacted refuse, the vehicle is driven to a land fill. The forward end of the refuse storage body is then lifted upwardly from the vehicle chassis to pivot the body and its rearward tailgate is opened so that the compacted refuse slides by gravity out of the body and onto the ground. See U.S. Pat. No. 4,552,500 of Ghibaudo et al.

The refuse collection vehicle can become dangerously unstable if the body is tilted too far and/or the vehicle is on too much of an incline when the body is tilted. Therefore, it has become popular to use a very long multi-stage hydraulic cylinder which can push the packer blade substantially the entire length of the refuse storage body to eject the refuse out the open rear end of the body without having to tilt the body on the vehicle chassis. However, such multi-stage hydraulic cylinders require substantial maintenance and are expensive to replace. Typically they must cycle thousands of times a day over short compacting strokes, while only having to travel a full stroke to eject a full body of refuse less than a dozen times per day, once for each trip to a landfill. Also, this packer arrangement suffers from springback of the refuse from the rear section of the body into the hopper section when the packer blade returns to its forward-most position.

SUMMARY OF THE INVENTION

It is therefore the primary object of the present invention to provide an improved packer system for a refuse collection vehicle.

It is another object of the present invention to provide an improved method for packing refuse into a refuse storage body of a refuse collection vehicle.

In accordance with the present invention a packer system for a refuse collection vehicle includes a hollow refuse storage body having a longitudinal axis and configured for mounting on a truck chassis. The body has a forward hopper section and a rear section with an open rear end. A tailgate is mounted to the rear section of the refuse storage body and is moveable between closed and open positions to seal and unseal the open rear end of the rear section of the refuse storage body. A load eject blade is mounted within the refuse storage body for reciprocating movement along the longitudinal axis. A packer blade is also mounted within the refuse storage body adjacent the load eject blade for reciprocating movement along the longitudinal axis. A first actuator is coupled between the refuse storage body and the packer blade for moving the packer blade over a first range of travel. The packer blade is moved in a rearward direction along the longitudinal axis and then in a forward direction along the longitudinal axis. This permits the packer blade to repetitively push refuse periodically dumped into the hopper section of the refuse storage body and compact the refuse into the rear section of the refuse storage body. A second actuator is coupled between the refuse storage body and the eject blade for moving the eject blade over a second range of travel. The eject blade is moved in a rearward direction along the longitudinal axis and in a forward direction along the longitudinal axis. This permits the eject blade to push trash that has been compacted in the rear section of the refuse storage body by the packer blade out the open rear end of the rear section of the refuse storage body when the tailgate has been moved to its open position.

In accordance with the present invention a method of compacting refuse includes the step of providing a hollow refuse storage body having a longitudinal axis, a forward hopper section, and a rear section with an open rear end. The next step is the closing of the rear end of the refuse storage body. The next step involves dumping refuse into the hopper section. The next step involves pushing the refuse in the hopper section in a rearward direction with a packer blade so that the refuse moves from the hopper section into the rear section of the refuse storage body. The steps of dumping refuse into the hopper section and then pushing the refuse rearwardly into the rear section of the refuse storage body with the packer blade are repeated until the rear section of the refuse storage body is substantially filled with compacted refuse. The final steps of the method involve opening the rear end of the refuse storage body and then pushing the compacted refuse out of the open rear end of the refuse storage body with an eject blade.

DESCRIPTION OF THE PREFERRED EMBODIMENTS

The entire disclosure of my aforementioned U.S. Pat. No. 4,552,500 granted Nov. 12, 1985 entitled REFUSE HAULING AND STORAGE APPARATUS and naming Jose A. Ghibaudo et al. as inventors is hereby incorporated by reference.

Figure 1:
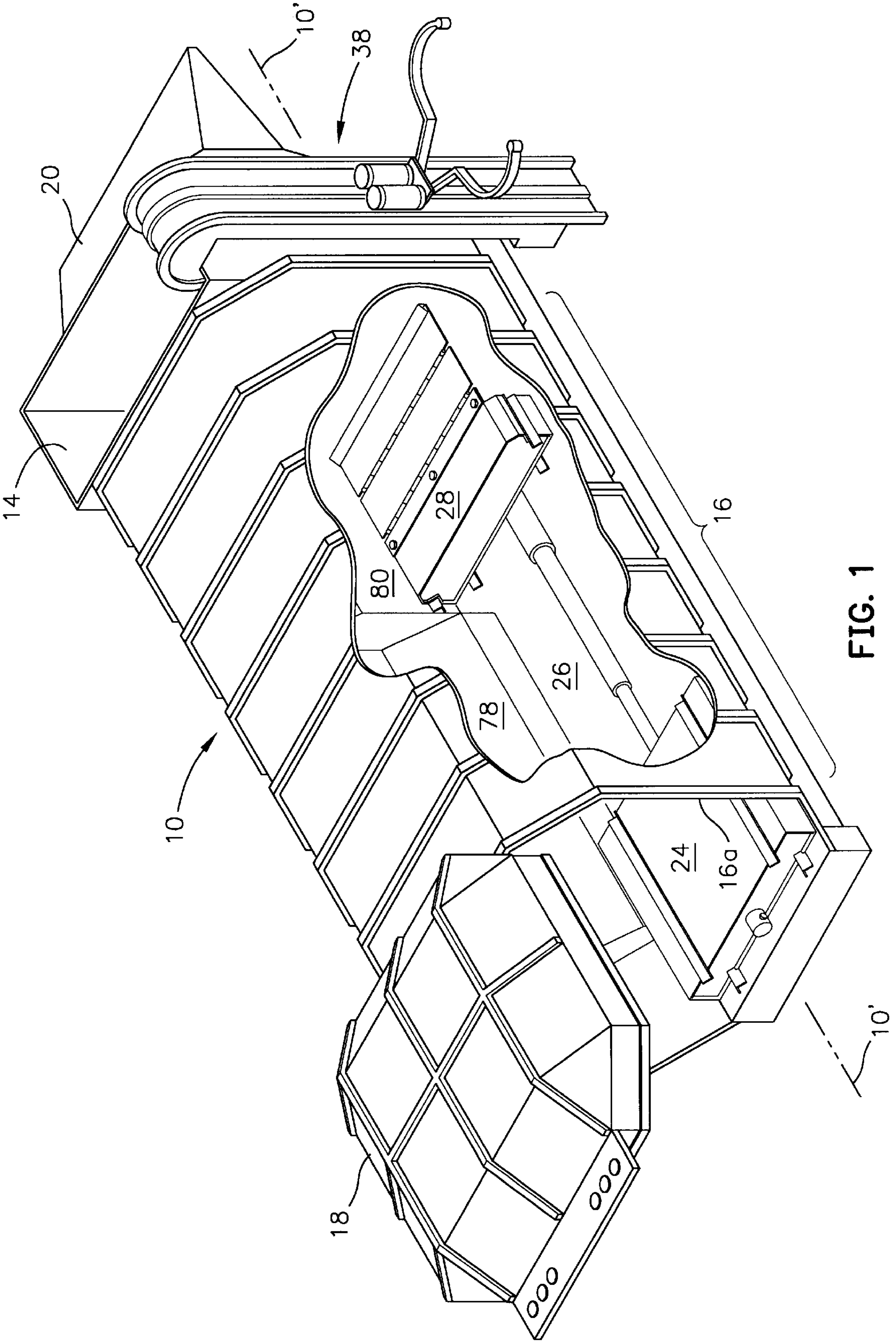
FIG. 1 is an isometric view of a refuse storage body, with portions broken away, incorporating a preferred embodiment of the packer system of the present invention. The body is designed to be mounted on a truck chassis which is not illustrated. Portions of the body are broken away.
Figure 7A:
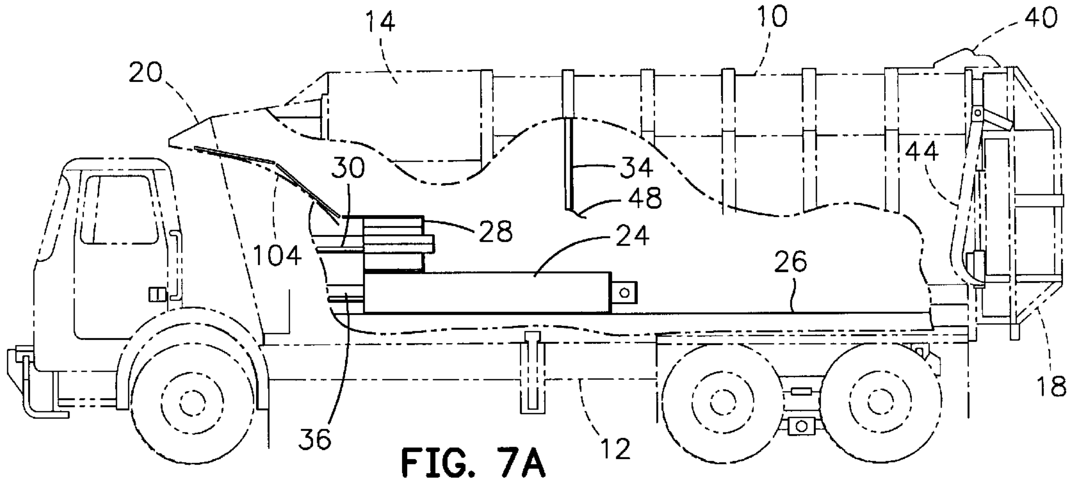
FIGS. 7A, 7B and 7C are a series of diagrammatic side elevation views of a refuse collection vehicle equipped with the packer system of FIGS. 1–6 illustrating the range of reciprocal motion of the load eject blade, packer blade and follower plate.
Figure 7B:
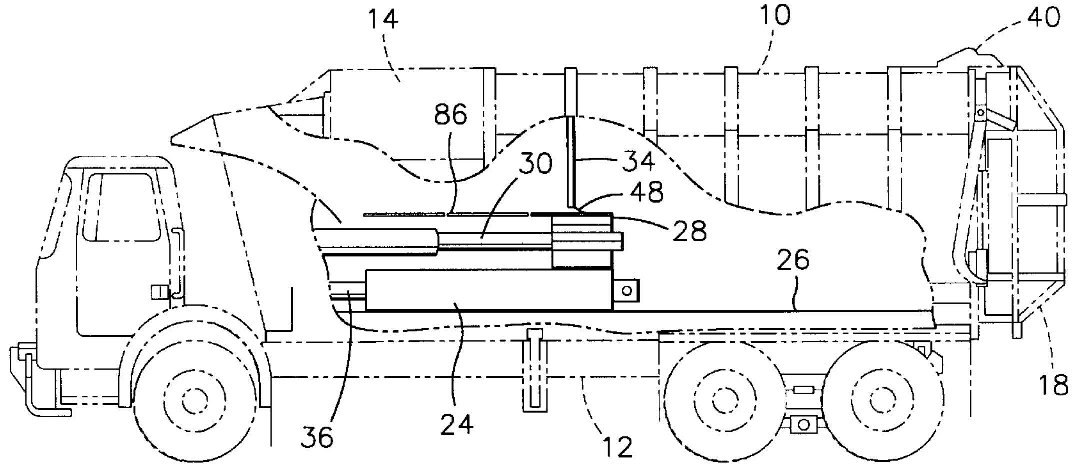
Figure 7C:
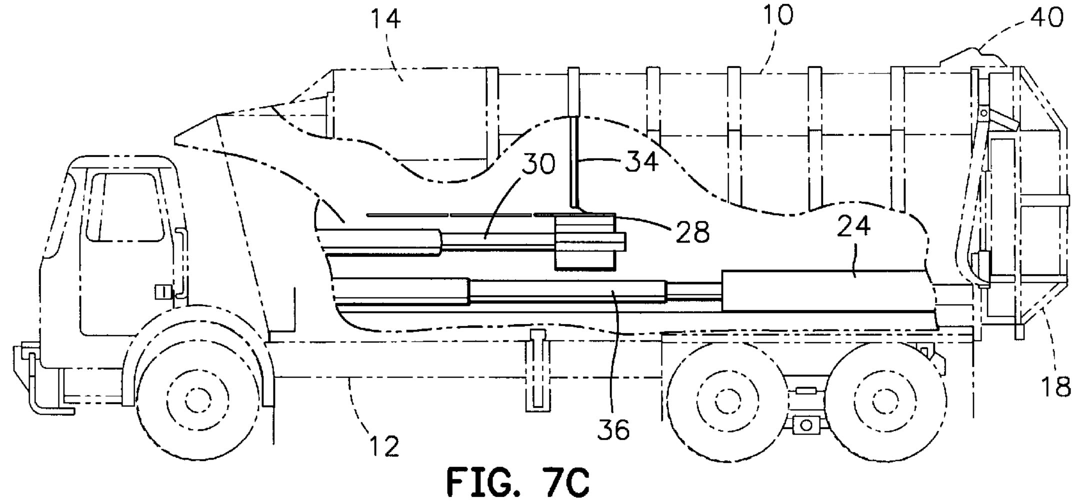

Referring to FIG. 1, a hollow steel refuse storage body 10 with a longitudinal axis 10' is configured for mounting on a truck chassis shown in phantom lines 12 in FIGS. 7A, 7B and 7C. The refuse storage body 10 (FIG. 1) has a forward upwardly opening hopper section 14 (FIG. 1) and a rear section 16 with an open rear end 16*a*. A tailgate 18 is hingedly mounted to the rear section 16 of the refuse storage body and is moveable between closed and open positions to seal and unseal the open rear end 16*a* of the rear section 16 of the refuse storage body 10. The rear section 16 of the refuse storage body 10 has a generally octagonal cross-section. The refuse storage body 10 further has a hollow canopy section 20 (FIGS. 1 and 7A) that extends above the cab 22 of the truck chassis 12.

A hollow steel box-like load eject blade 24 (FIG. 1) is mounted within the refuse storage body 10 for reciprocating movement along the longitudinal axis 10' along a bottom floor 26 of the refuse storage body 10. A hollow steel box-like packer blade 28 is mounted within the refuse storage body 10 for reciprocating movement along the longitudinal axis 10' overlapping the upper surface of the eject blade 24. A pair of single stage hydraulic cylinders 30 and 32 (FIG. 3) are coupled in criss-cross fashion between the refuse storage body 10 and the packer blade 28 for moving the packer blade 28 over a first range of travel. The forward ends of the cylinders 30 and 32 are connected to pivot mounts (not shown) attached to a forward wall of the hopper section 14. The rearward portions of the cylinders 30 and 32 extend inside the hollow packer blade 28 and are connected to pivots 33*a* and 33*b* secured between the upper and lower panels of the packer blade 28. The packer blade 28 is moved rearwardly and forwardly inside the hopper section 14 underneath a vertical steel divider wall 34 (FIG. 7A) of the refuse storage body 10 which prevents spring back of refuse into the hopper section 14. This permits the packer blade 28 to push refuse periodically dumped into the hopper section 14 of the refuse storage body 10 and compact the refuse into the rear section 16 of the refuse storage body up against the closed tailgate 18.

A multi-stage hydraulic cylinder 36 (FIG. 3) is coupled between the refuse storage body 10 and the eject blade 24 for moving the eject blade 24 over a second range of travel much greater in length than the first range of travel of the packer blade 28. This permits the eject blade 24 to push refuse that has been compacted in the rear section 16 of the refuse storage body 10 by the packer blade 28 out the open rear end of the rear section 16 of the refuse storage body 10 when the tailgate 18 has been moved to its open position.

The refuse is loaded into the hopper section 14 with a side loader 38 (FIG. 1) which may be of the type disclosed in my U.S. patent application Ser. No. 08/658,325 filed Jun. 5, 1996 entitled BOOMLESS AUTOMATED SIDE LOADER FOR REFUSE COLLECTION VEHICLE HAVING LIFT ARM WITH NON-EXTENDABLE UPPER END, which issued as U.S. Pat. No. 5,702,225, granted on Dec. 30, 1997. The entire disclosure of said patent is hereby incorporated by reference.

Figure 4:
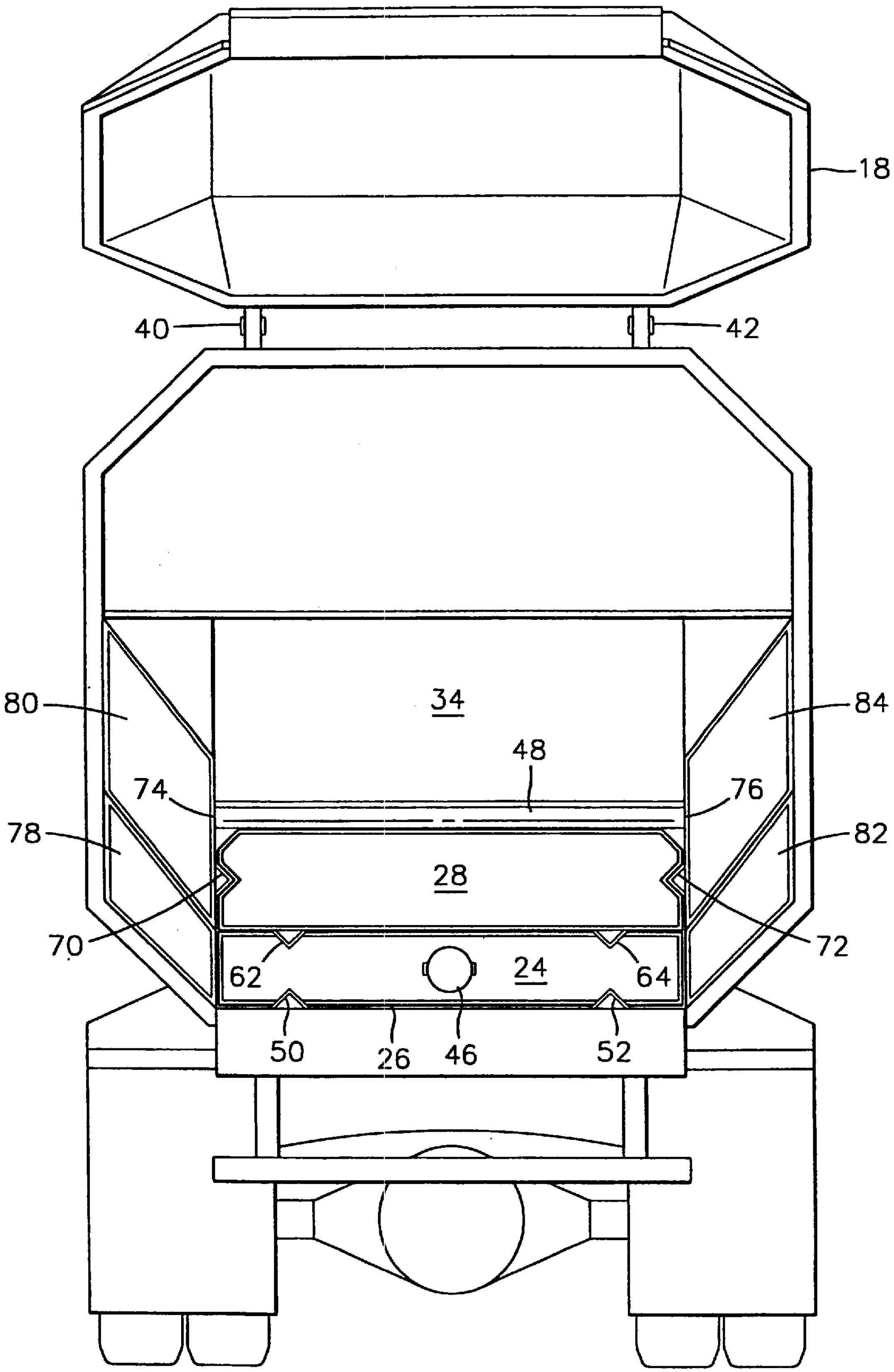
FIG. 4 is an enlarged rear end elevation view of the refuse body of FIG. 1 showing the overlapping sliding relationship of the packer and eject blades.

Referring to FIG. 4, the packer blade 28 slides over the top surface of the eject blade 24 which in turn slides over the bottom floor 26 of the refuse storage body 10. The tailgate 18 is pivotally mounted to the upper tail end of the body 10 by a pair of hinge assemblies 40 and 42. The tailgate 18 is opened and closed by a pair of hydraulic cylinder and linkage assemblies such as 44 (FIG. 7A) mounted on opposite sides of the tail end of the refuse storage body 10.

Figure 5:
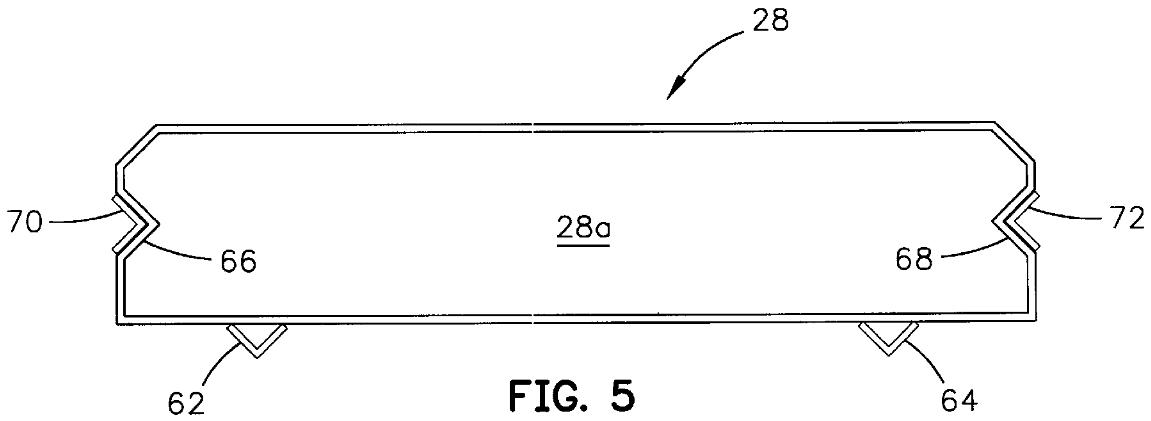
FIG. 5 is an enlarged end elevation view of the packer blade.
Figure 6:
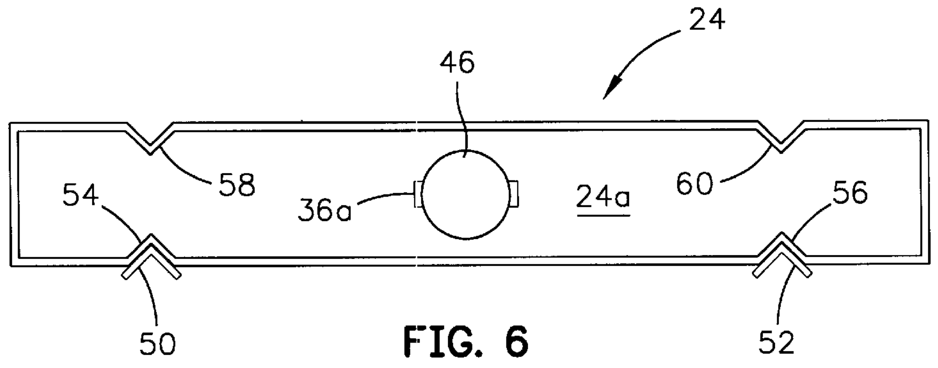
FIG. 6 is an enlarged end elevation view of the eject blade.

FIGS. 5 and 6 are enlarged end elevation views of the packer blade 28 and eject blade 24, respectively. Each blade is fabricated of steel plates which are cut and welded to form a box-like hollow member. The packer blade 28 has a rearwardly facing vertical end wall 28*a* which pushes refuse in the hopper section 14 rearwardly as the packer blade 28 reciprocates. The eject blade 24 has a rearwardly facing vertical end wall 24*a* which pushes the compacted trash out of the open rear end of the refuse storage body 10. The rearward end of the multi-stage cylinder 36 (FIG. 3) has a cross-member 36*a* that fits within opposite holes in a mounting cylinder 46 welded to the end wall 24*a* of the eject blade 24.

Figure 2:
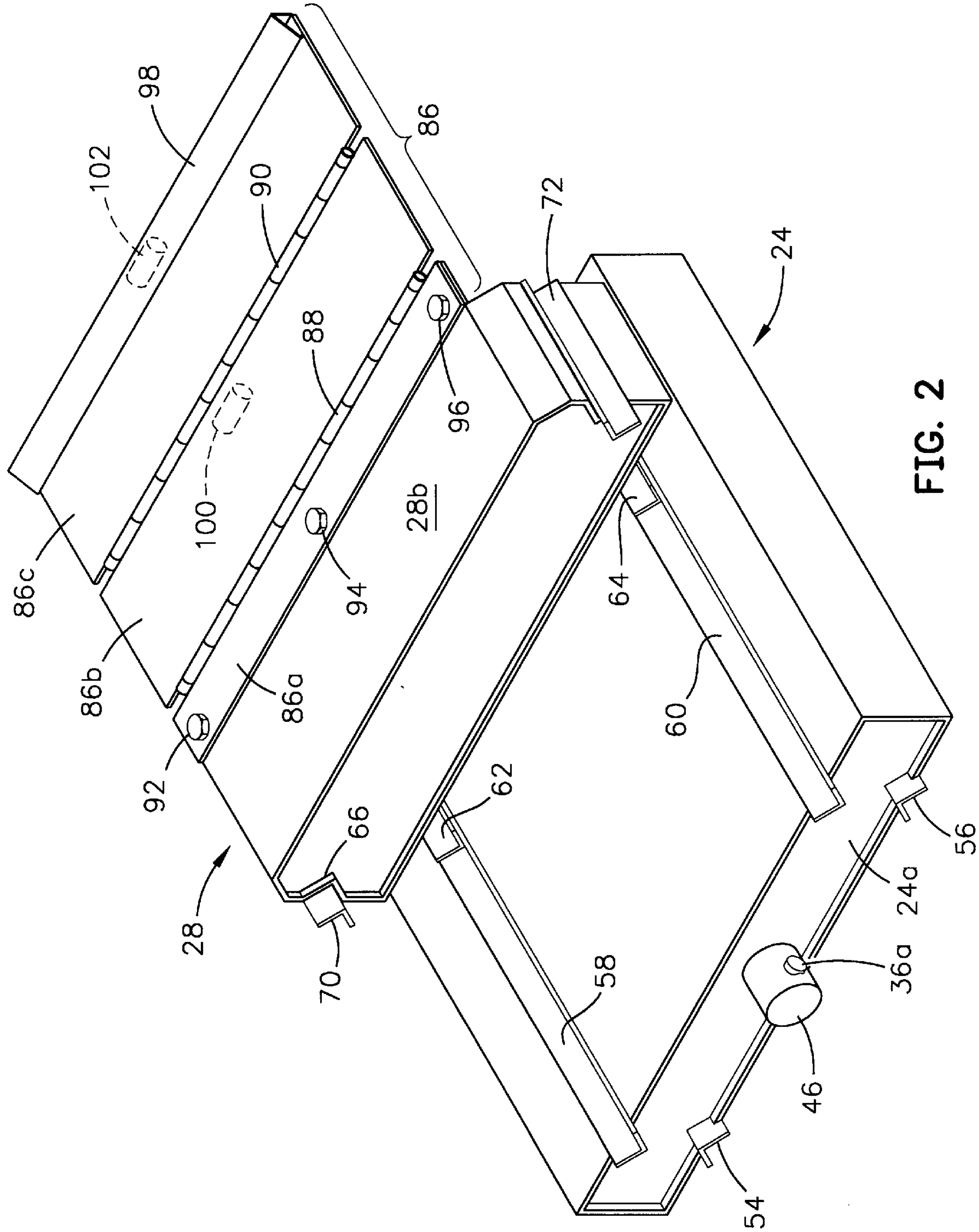
FIG. 2 is an enlarged exploded isometric view of the packer system of FIG. 1 with the refuse storage body and hydraulic cylinders removed.

As best seen in FIG. 7A, the longitudinal dimension of the packer blade 28 is approximately one-quarter the longitudinal dimension of the eject blade 24. FIGS. 7A, 7B and 7C illustrate the range of reciprocal motion of the packer blade 28 and the eject blade 24. As the refuse collection vehicle equipped with the refuse storage body 10 of the present invention travels along its pick-up route, refuse containers that are picked up curbside by the side loader 38 are inverted and dumped into the hopper section 14, one after another. When this is occurring the eject blade is located in its forwardmost position illustrated in FIG. 7A. The top surface of the eject blade 24 thus forms the bottom floor of the hopper section 14. When the hopper section 14 is partially full of refuse, the vehicle operator actuates a control to cause the packer blade to move rearwardly to its rearwardmost position shown in FIG. 7B. The single hydraulic cylinders 30 and 32 (FIG. 3) extend to push the packer blade 28 rearwardly to its rearwardmost position illustrated in FIG. 7B. Thereafter the packer blade 28 automatically returns to its forwardmost position illustrated in FIG. 7A. The end wall 28*a* (FIG. 2) of the packer blade 28 pushes the refuse underneath the vertical divider wall 34 and into the rear section 16 of the refuse storage body 10. The lower horizontal edge of the divider wall 34 is equipped with a transversely extending flexible synthetic rubber flap 48 (FIG. 4) which is deflected rearwardly as the packer blade 28 moves underneath the divider wall as illustrated in FIG. 7B. The upper surface of the packer blade is just below the lower horizontal edge of the divider wall 34 and the flexible flap 48 covers the small opening that would otherwise exist between the top surface of the packer blade 28 and the divider wall 34 when the packer blade 28 moves under the divider wall 34.

As the refuse collection vehicle continues along its pick up route more and more refuse is dumped into the hopper section 14 by the side loader 38. Refuse within the hopper section 14 is repeatedly pushed into the rear section 16 of the refuse storage body 10 by repeated rearward movement of the packer blade 28. Thus the as the packer blade 28 reciprocates back and forth between its positions illustrated in FIGS. 7A and 7B refuse is compacted inside the rear section 16 against the closed tailgate 18. During this process, the eject blade 28 remains stationary in its forwardmost position illustrated in FIGS. 7A and 7B. The packer blade 28 reciprocates over the first range of travel from its forwardmost position illustrated in FIG. 7A to its rearwardmost position illustrated in FIG. 7B. When the packer blade 28 is in its forwardmost position, the front end wall of the packer blade 28 is vertically aligned with the front end wall of the eject blade 24. When the packer blade 28 is in its rearwardmost position, the rear end wall 28*a* of the packer blade is vertically aligned with the rear end wall 24*a* of the eject blade.

Figure 3:
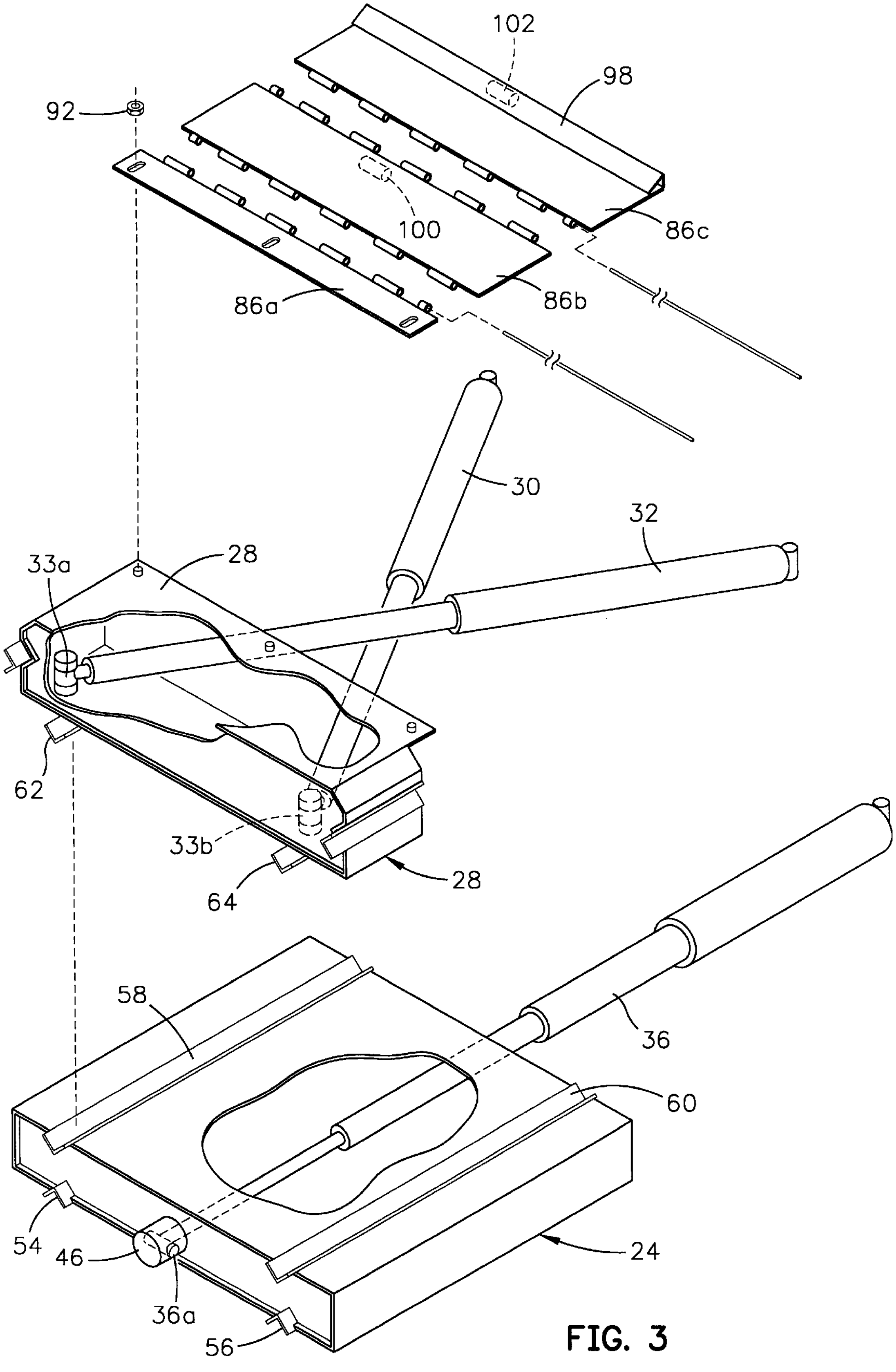
FIG. 3 is an enlarged isometric view of the load eject blade, packer blade and follower plate of the packer system of FIG. 1.

Once the rear section 16 of the refuse storage body 10 is filled with compacted refuse, the driver of the refuse collection vehicle drives to the municipal landfill. Once in a dumping location at the dump, the driver actuates a control that swings open the tailgate 18. The driver then actuates another control that causes the eject blade 24 to move from its forwardmost position illustrated in FIGS. 7A and 7B, to its rearwardmost position illustrated in FIG. 7C. The rear end wall 24*a* of the eject blade pushes on the bottom of the compacted load of refuse and pushes the entire load outside the refuse storage body 10 onto the ground. No potentially dangerous tilting of the refuse storage body 10 relative to the vehicle chassis 12 is required to dump the load of compacted refuse. The rearward movement of the eject blade 24 is caused by the telescopic extension of the lone multi-stage cylinder 36 (FIG. 3). Once the load of compacted refuse has been pushed out of the refuse storage body 10, the eject blade 24 automatically returns to its forwardmost position illustrated in FIGS. 7A and 7B.

As shown in FIGS. 7A, 7B and 7C, the eject blade 24 travels over the second range of travel which is roughly four-times the first range of travel of the packer blade 28. Thus it will be understood that during a day-long pick-up route, the hydraulic cylinders 30 and 32 may cycle thousands of time to compact a dozen truck loads of refuse. However, the hydraulic cylinder 36 will only cycle one dozen times, once to eject each load. This is a very significant improvement over existing non-tilting refuse collection vehicles that use the same multi-stage cylinder to move a singe packer blade over a short range of travel to compress a load, and then over a long range of travel to eject the load. Multi-stage hydraulic cylinders capable of extending twelve feet and more require a high degree of maintenance and are very expensive to replace. When multi-stage hydraulic cylinders are used during the compacting cycle thousands of times they wear out quickly.

The stacked arrangement of the packer blade 28 and the eject blade 24 within the refuse storage body provides several benefits. The rear end wall 24*a* of the eject blade prevents spring-back of refuse from the rear section 16 of the refuse storage body 10 back into the hopper section 14. The divider wall 34 also helps prevent such spring back. Thus the arrangement described above results in greater and more efficient compacting of refuse within the rear section 16 of the refuse storage body 10. In addition, since the upper horizontal surface of the eject blade 24 functions as the bottom floor of the hopper section 14, it can readily be replaced by removing and repairing the eject blade 24. In conventional refuse collection vehicles of the non-tiling type, the bottom floor of the hopper section is the bottom floor of the entire refuse storage body 10. This floor is not readily replaced, however, it is subject to excessive wear due to the fact that the packer blade cycles over the same thousands of times during the typical pick-up route.

Optimum performance of the combination of the packer blade 28 and eject blade 24 is achieved by ensuring that each blade is properly guided and supported over its range of travel. Therefore, the bottom floor 26 of the body 10 is provided with parallel tracks 50 and 52 (FIG. 4) which extend longitudinally substantially the entire length of the refuse storage body 10. These tracks 50 and 52 preferably comprise inverted V-shaped steel members that are welded to the bottom floor 26 of the refuse storage body 10. The bottom surface of the eject blade 24 is provided with downwardly opening longitudinally extending V-shaped runner elements 54 and 56 (FIG. 6). These runner elements 54 and 56 are configured to mate with the corresponding V-shaped tracks 50 and 52 to guide the eject blade 24 along the bottom floor 26 of the refuse storage body 10. The upper surface of the eject blade 24 is provided with upwardly opening longitudinally extending V-shaped tracks 58 and 60. These tracks 58 and 60 mate with V-shaped runner elements 62 and 64 (FIG. 5) welded to the bottom surface of the packer blade 28. This arrangement serves to guide the packer blade 28 as it travels back and forth over the top surface of the eject blade 24. In addition, the side walls of the packer blade 28 are provided with a pair of outwardly opening longitudinally extending V-shaped runner elements 66 and 68. These runner elements 66 and 68 mate with horizontal, longitudinally extending V-shaped steel rails 70 and 72 that are welded to the opposite vertical side walls 74 and 76 (FIG. 4) of the refuse storage body 10. The rails 70 and 72 also serve to guide the packer blade 28 during its reciprocal motion. The rails 70 and 72 also support the packer blade 28 when the eject blade 24 moves out from underneath the same as illustrated in FIG. 7C.

As illustrated in FIGS. 1 and 4, the rear section 16 of the refuse storage body has trapezoidal shaped hollow steel bodies 78, 80, 82 and 84 which contour the lower part of its hollow interior to optimize the compaction of refuse by the packer blade 28 and the dumping of refuse by the eject blade 24. The bodies 80 and 84 extend within the forward part of the body 10 within the hopper section 14 and the rear section 16. Their inwardly facing side walls are the side walls 74 and 76 to which the rails 70 and 72 are welded. The bodies 78 and 82 extend rearwardly from the bodies 80 and 84. The inwardly facing walls of the bodies 78 and 82 form the lower side walls of the rear section 16 that face the sidewalls of the eject blade 24. The upper walls of the bodies 78, 80, 82 and 84 are inwardly inclined to insure that refuse between the bodies falls into the center of the body 10 for pushing by the blades 24 and 28.

A multi-section articulating follower plate 86 (FIG. 2) is connected to the forward top edge of the packer blade 28 for covering the hopper section 14 as the packer blade 28 moves rearwardly. This prevents refuse from falling below the packer blade 28 in the hopper section 14 to a location where it cannot be moved rearwardly by the packer blade 28. This is the area where the single stage hydraulic cylinders 30 and 32 are coupled in scissors fashion. This is also the area where the forward end of the multi-stage hydraulic cylinder 36 is coupled to the forward end of the refuse storage body 10. It is undesirable for refuse to come into contact with these actuator mechanisms. The follower plate 86 comprises three planar steel segments 86*a,* 86*b* and 86*c* connected by a pair of piano-style hinges 88 and 90. The rearwardmost segment 86*a* is connected to a forward flange extension of the upper surface 28*b* of the packer blade 28 by nut and bolt assemblies 92, 94 and 96. The leading edge of the forwardmost segment 86*c* is provided with a bumper 98. A pair of rollers 100 and 102 shown in phantom lines are mounted to the underside of the center of the follower plate 86. The rollers 100 and 102 ride on a curved guide track 104 (FIG. 7A) centrally supported inside the hollow canopy section 20 comprising the forward end of the refuse storage body 10. When the packer blade 28 is in its forwardmost position illustrated in FIG. 7A, the follower plate 86 is stowed in an inclined position within the canopy section 20. As the packer blade 28 moves rearwardly the follower plate 86 descends out of the canopy section 20 to its flat configuration illustrated in FIG. 7B. Rollers (not illustrated) are also preferably provided on the edges of the follower plate 86 for rolling along similar curved guide tracks (not illustrated) mounted to the sides of the hopper section 14 and canopy section 20 of the refuse storage body 10.

I have found the best method of operation of my dual blade packer system for refuse ejection is as follows. After the refuse collection vehicle has driven to the municipal landfill and is in position for dumping, the driver actuates a control that causes the packer blade 28 to move to its rearwardmost position illustrated in FIG. 7B. The eject blade 24 is then moved rearwardly one-quarter of its range of travel and then returned to its forwardmost position. Finally, the eject blade 24 is then moved rearwardly one-quarter of its range of travel a second time and then returned once again to its forwardmost position. Finally, the eject blade 24 is moved rearwardly all the way to its rearwardmost position illustrated in FIG. 7C. This method of ejection insures that the large mass of compacted refuse in the rear section 16 of the refuse storage body 10 is pushed out the open rear end of the body 10 onto the ground.

Figure 8:
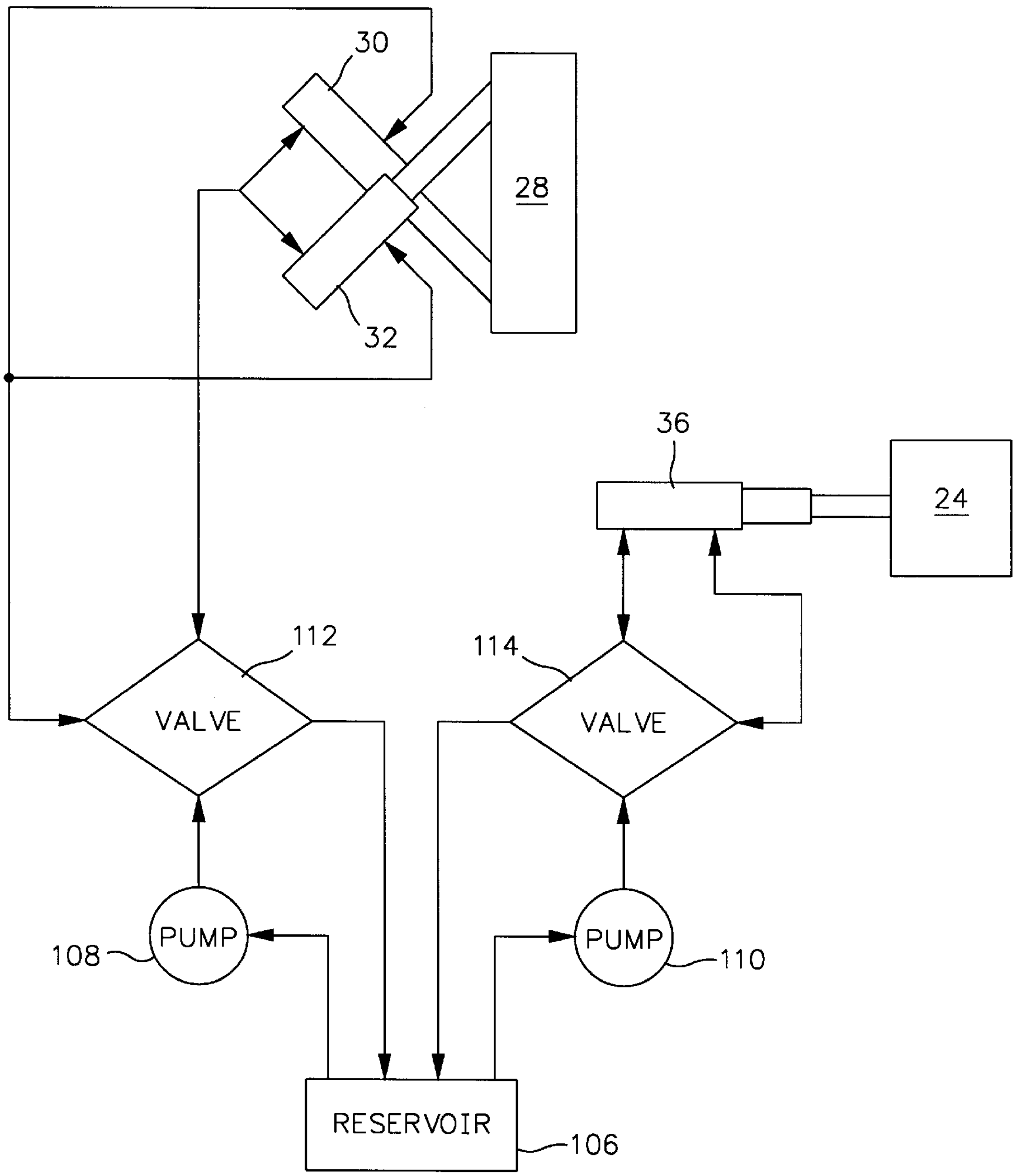
FIG. 8 is a simplified block diagram of the control portion of the packer system of FIG. 1.

FIG. 8 is a greatly simplified block diagram of the control portion of my packer system. A hydraulic fluid reservoir 106 is provided for delivering hydraulic fluid to electric pumps 108 and 110 that can be selectively energized to pump hydraulic fluid to valves 112 and 114, respectively. The valve 112 can be switched to direct hydraulic fluid to the single stage cylinders 30 and 32 coupled to the packer blade 28 to move the packer blade 28 rearwardly and forwardly, as desired. The valve 114 can be switched to direct hydraulic fluid to the multi-stage cylinder 36 coupled to the eject blade 24 to move the eject blade rearwardly and forwardly, as desired. Return lines connect the valves 112 and 114 to the hydraulic fluid reservoir 106. In the commercial embodiment of my packer system, a combination of electrical, pneumatic and hydraulic controls are used to operate the pumps 108 and 110, the valves 112 and 114 and the cylinders 30, 32 and 36. The cylinders function as the mechanical actuators for the blades 24 and 28. Control systems of this general type are well known to those of ordinary skill in the art and accordingly the details thereof need not be set forth herein.

To recapitulate, my packer system and method permit full push out and unloading of an entire load of compacted refuse while at the same time avoiding the usage of a multi-stage hydraulic cylinder for packing the refuse. The multi-stage hydraulic cylinder is used sparingly and only for push out a collected load, usually less than a dozen times per day. Singe stage hydraulic cylinders are used for "in route" packing of refuse. This arrangement decreases maintenance costs because single stage hydraulic cylinders are much cheaper and easier to maintain that multi-stage hydraulic cylinders. The lower eject blade of my system increases the packing ability of the refuse collection vehicle by not allowing refuse to spring back into the loading area of the hopper section. The top surface of the eject blade 24 serves as the floor of the hopper section 14. In conventional refuse collection vehicles having only a single blade the hopper section floor is the floor of the overall refuse storage body itself. This is one of the first parts of the refuse collection system that normally wears out and it is difficult, time consuming and expensive to repair or replace. The time and cost associated with repairing or replacing the eject blade are far less. Also, in my design, the blades are both stabilized and guided by V-shaped tracks, rails and runners. These parts may be made of very strong steel to resist wear, and can be replaced as needed. Of course these components should be periodically greased to reduce wear.

Having described preferred embodiments of my packer system and method for a refuse collection vehicle, modifications and adaptations thereof will occur to those skilled in the art. For example, my invention could easily be adapted to a refuse collection vehicle having a front loader configuration instead of the side loader configuration illustrated. Instead of hydraulic actuators, electrically driven screw-type actuators could be used to move the blades. The shape, placement and range of motion of the blades could be varied depending upon the configuration of the refuse storage body. Therefore, the protection afforded my invention should only be limited in accordance with the scope of the following claims.

I claim:

1. A packer system for a refuse collection vehicle, comprising:

a hollow refuse storage body having a longitudinal axis and configured for mounting on a truck chassis, the body having a fixedly mounted forward hopper section and a rear section with an open rear end;

a tailgate mounted to the rear section of the refuse storage body and moveable between closed and open positions to seal and unseal the open rear end of the rear section of the refuse storage body;

a load eject blade mounted within the refuse storage body for reciprocating movement along the longitudinal axis adjacent a bottom floor of the refuse storable body;

a packer blade mounted within the refuse storage body adjacent the load eject blade for reciprocating movement along the longitudinal axis, the packer blade being mounted on and overlapping an upper surface of the eject blade;

a first actuator coupled between the refuse storage body and the packer blade for moving the packer blade over a first range of travel in a rearward direction along the longitudinal axis and then in a forward direction along the longitudinal axis to repetitively push refuse periodically dumped into the hopper section of the refuse storage body and compact the refuse into the rear section of the refuse storage body; and a second actuator coupled between the refuse storage body and the eject blade for moving the eject blade over a second range of travel in a rearward direction along the longitudinal axis and in a forward direction along the longitudinal axis to push refuse that has been compacted in the rear section of the refuse storage body by the packer blade out the open rear end of the rear section of the refuse storage body when the tailgate has been moved to its open position.

2. The packer system of claim 1 wherein each blade comprises a generally box-like hollow member with flat upper and lower surfaces.

3. The packer system of claim 1 wherein the first actuator includes at least one hydraulic cylinder.

4. The packer system of claim 1 wherein the second actuator a hydraulic cylinder.

5. The packer system of claim 1 wherein the first actuator includes a pair of single stage hydraulic cylinders mounted in criss-cross overlapping relationship.

6. The packer system of claim 1 wherein the second actuator includes a multi-stage hydraulic cylinder.

7. The packer system of claim 1 wherein the refuse storage body includes a divider wall that separates the hopper section of the refuse body from the rear section of the refuse body and an upper surface of the packer blade travels beneath a lower edge of the divider wall.

8. The packer system of claim 1 wherein the second range of travel is substantially greater than the first range of travel.

9. A packer system for a refuse collection vehicle, comprising:

a hollow refuse storage body having a longitudinal axis and configured for mounting on a truck chassis, the body having a fixedly mounted a forward hopper section and a rear section with an open end;

tailgate means mounted to the rear section of the refuse storage body and moveable between closed and open positions for sealing and unsealing the open end of the rear section of the refuse storage body;

load eject blade means mounted within the refuse storage body for reciprocating movement over a bottom floor of the refuse storage body along the longitudinal axis;

packer blade means mounted within the refuse storage body for reciprocating movement over a top surface of the load eject blade along the longitudinal axis;

first actuator means coupled between the refuse storage body and the packer blade means for moving the packer blade means over a first range of travel in a rearward direction along the longitudinal axis and then in a forward direction along the longitudinal axis for repetitively pushing refuse periodically dumped into the hopper section of the refuse storage body and compacting the refuse into the rear section of the refuse storage body; and second actuator means coupled between the refuse storage body and the eject blade means for moving the eject blade means over a second range of travel in a rearward direction along the longitudinal axis and in a forward direction along the longitudinal axis to push refuse that has been compacted in the rear section of the refuse storage body by the packer blade means out the open end of the rear section of the refuse storage body when the tailgate has been moved to its open position, the second range of travel being substantially greater than the first range of travel.

10. The packer system of claim 9 and further comprising a follower plate connected to the packer blade means means for covering the hopper section as the packer blade moves in the rearward direction.

11. The packer system of claim 10 wherein the refuse storage body further includes a hollow canopy section that extends in the forward direction from the hopper section, the canopy section being dimensioned and configured for receiving the follower plate when the packer blade means is moved in the forward direction.

12. The packer system of claim 9 wherein the eject blade means comprises a box-like hollow member and the system further comprises track means on a bottom floor of the refuse storage body for engaging a bottom surface of the box-like hollow member and guiding the box-like hollow member within the refuse storage body.

13. The packer system of claim 9 wherein the packer blade means comprises a box-like hollow member and the system further comprises rail means on a pair of opposite side walls of the refuse storage body for engaging a corresponding set of sidewalls of the box-like hollow member and guiding the box-like hollow member within the refuse storage body.

14. The packer system of claim 9 wherein the first actuator means includes a pair of single stage hydraulic cylinders mounted in criss-cross overlapping relationship.

15. The packer system of claim 9 wherein the second actuator means includes a multi-stage hydraulic cylinder.

16. The packer system of claim 9 wherein the refuse storage body includes a divider wall that separates the hopper section of the refuse body from the rear section of the refuse body.

17. The packer system of claim 6 wherein an upper surface of the packer blade means travels beneath a lower edge of the divider wall.

18. A packer system for a refuse collection vehicle, comprising:

a hollow refuse storage body having a longitudinal axis and configured for mounting on a truck chassis, the body having a fixedly mounted forward hopper section and a rear section with an openable rear end, the refuse storage body including a generally vertically extending divider wall that separates the hopper section from the rear section of the storage body;

overlapping upper and lower packer and load eject blades mounted within the storage body for independent reciprocation along the longitudinal axis, the load eject blade being movable in a generally horizontal direction adjacent a bottom floor of the storage body and the packer blade being movable in a generally horizontal direction over an upper surface of the eject blade, the packer blade and the eject blade each being formed of box-like members, each box-like member having a width that spans a substantial portion of a width of the storage body and a height that is substantially less than the width of the box-like member;

means connected to the storage body for supporting and guiding the movement of the eject blade over the bottom floor of the storage body;

means connected to the storage body for supporting and guiding the movement of the packer blade above the eject blade and so that an upper surface of the packer blade travels beneath a lower horizontally extending edge of the divider wall in close proximity thereto, a first actuator coupled between the packer blade and the storage body for repetitively moving the packer blade over a first limited range of travel to allow the packer blade to push refuse dumped into the hopper section on top of the upper surface of the eject blade rearwardly for compacting the refuse into the rear section of the storage body;

a second actuator coupled between the eject blade and the storage body for repetitively moving the eject blade over a second extended range of travel having a length longer than a length of the first limited range of travel of the packer blade so that the eject blade can push refuse compacted in the rear section of the storage body out the rear end of the storage body when the rear end of the storage body is opened; and a follower plate connected between the packer blade and the storage body for covering the hopper section as the packer blade moves in a rearward direction to prevent refuse from falling onto the first actuator.

* * * * *